United States Patent Office 3,843,512
Patented Oct. 22, 1974

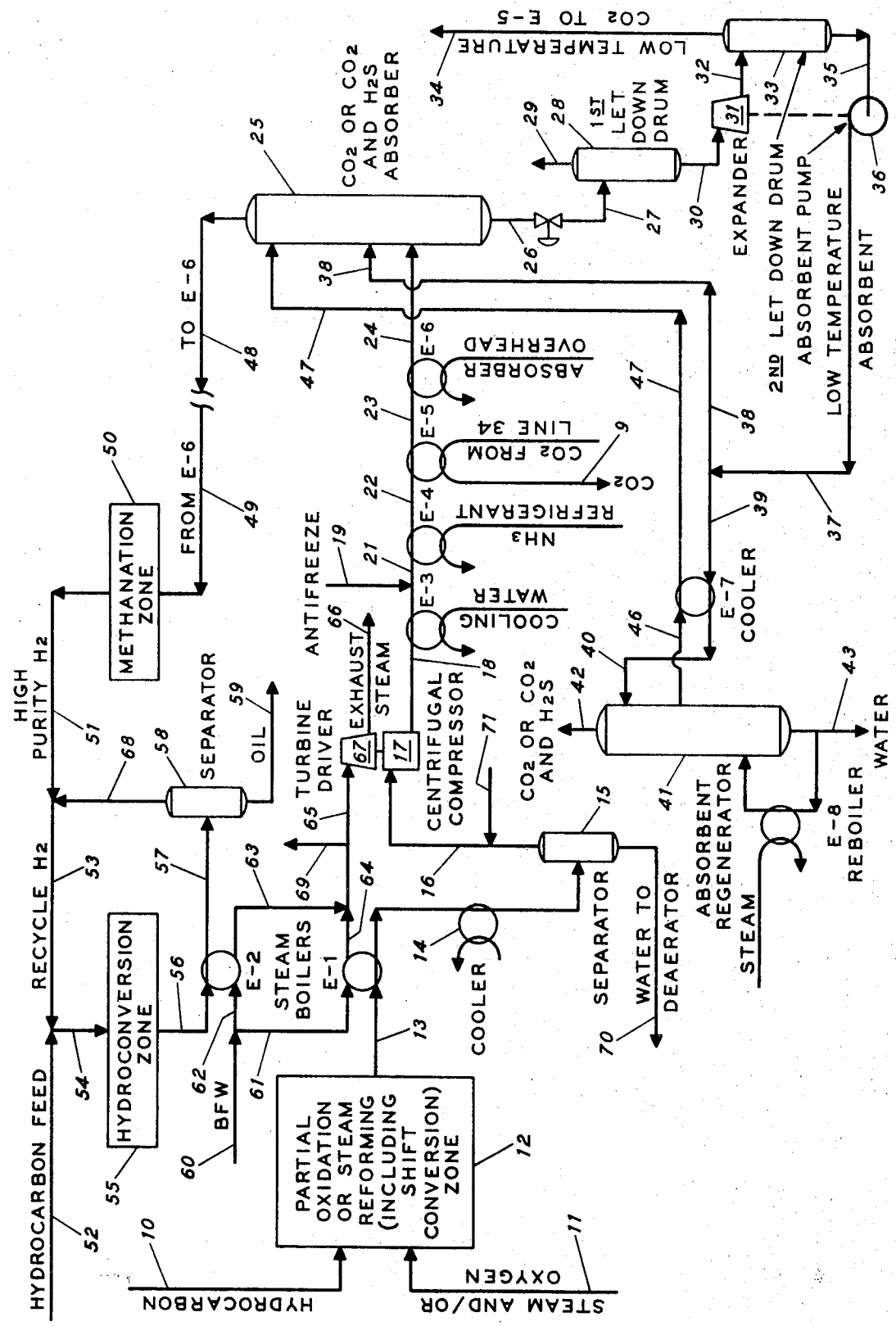

3,843,512
HYDROGEN MANUFACTURE USING
CENTRIFUGAL COMPRESSORS
Calvin S. Smith and William J. McLeod, El Cerrito, Calif., assignors to Chevron Research Company, San Francisco, Calif.
Application May 17, 1968, Ser. No. 736,520, now Patent No. 3,618,331, which is a continuation-in-part of abandoned application Ser. No. 665,106, Sept. 1, 1967. Divided and this application June 26, 1970, Ser. No. 59,865
The portion of the term of the patent subsequent to Oct. 13, 1988, has been disclaimed
Int. Cl. C10g 23/00
U.S. Cl. 208—212                                                4 Claims

ABSTRACT OF THE DISCLOSURE

High purity and high pressure hydrogen is prepared and employed in a hydroconversion process in a combined process in which a mixture comprising carbon dioxide, carbon monoxide and hydrogen having a molecular weight of at least 4 is centrifugally compressed to a pressure of at least 900 p.s.i.g. using a centrifugal compressor and carbon dioxide is subsequently removed from the compressed mixture, the resulting purified and compressed hydrogen is reacted with hydrocarbons in a hydroconversion zone and steam generated from hot effluent streams is used to drive the centrifugal compressor.

---

This application is a division of Ser. No. 736,520, filed May 17, 1968, now U.S. Pat. No. 3,618,331, which in turn, is a continuation-in-part of Ser. No. 665,106, filed Sept. 1, 1967, now abandoned

BACKGROUND OF THE INVENTION

(1) Field of the Invention

This invention relates to processes for the production, compression, and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

(2) Description of the Prior Art

A. Means for obtaining raw, hydrogen-rich gas. There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

$$C_nH_{2n+2} + nH_2O \rightleftharpoons nCO + (2n+1)H_2$$
$$C_nH_{2n+2} + 2nH_2O \rightleftharpoons nCO_2 + (3n+1)H_2$$

e.g., methane-steam:

$$CH_4 + H_2O \rightleftharpoons CO + 3H_2;$$

and $$CH_4 + 2H_2O \rightleftharpoons CO_2 + 4H_2$$

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons; for example, with methane, the reaction is:

$$CH_4 + \tfrac{1}{2}O_2 \rightleftharpoons H_2 + CO$$

With heavier hydrocarbons, the reaction may be represented as follows:

$$C_7H_{12} + 2.8\ O_2 + 2.1\ H_2O \rightleftharpoons 6.3\ CO + .7\ CO_2 + 8.1\ H_2$$

Both catalytic and noncatalytic partial oxidation processes are in use. Suitable operating conditions include temperature from 2,000° F. up to about 3,200° F., and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

$$CO + H_2O \rightleftharpoons H_2 + CO_2$$

This reaction is typically effected by passing the CO and $H_2O$ over a catalyst such as iron oxide activated with chromium. The reaction kinetics are faster at higher temperature, but the equilibrium to hydrogen is favored by lower temperatures. Therefore, it is not uncommon to have a high temperature shift stage followed by a low temperature shift stage. Pressure has little bearing on the equilibrium in the water-gas shift reaction.

B. $CO_2$ or $CO_2 + H_2S$ removal.—Because most hydrogen-using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed, In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing $135 \times 10^6$ standard cubic feet per day of hydrogen, over $300 \times 10^6$ B.t.u.'s per hour are generally required to reboil the MEA in order to effect the regeneration of the MEA. These $300 \times 10^6$ B.t.u.'s per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems—for example, hot carbonate—are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slipstream of the absorbent from the bottom of the stripper. Only that portion of the slipstream that is vaporized is returned to the stripper system. Heavy tarry material collects in the bottom of the reclaimer and is periodically withdrawn and passed to sewerage as a spent alkanolamine stream. Common practice is to clean the reclaimer as frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, this cleaning procedure is necessary to avoid build-up of corrosive bodies in the $CO_2$ absorption system. Corrosion, which would be worse without the reclaimer, still is a considerable problem in the alkanolamine $CO_2$ absorption systems.

C. Compression of high purity hydrogen.—Some of the processes which use high purity hydrogen as a reactant are: hydrodesulfurization, operating at pressures between about 100 and 1,500 p.s.i.g.; hydrotreating, operating at pressures between about 200 and 2,000 p.s.i.g.; hydrocracking, operating at pressures between about 450 and 3,000 p.s.i.g.; and thermal hydrodealkylation, operating at pressures between about 450 and 1,000 p.s.i.g. All of these just-mentioned hydroconversion processes may operate at even higher pressures (for example, up to 10,000 p.s.i.g.) than just given but seldom will operate at pressures lower than the range given. Thus it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by centrifugal force exerted on an entrapped gas during rotation of an impeller at high speed. Most centrifugal compressors depend primarily on centrifugal force and high tangential velocity of the fluid in the periphery of the impeller (or rotors or blades in the instance of some turbocompressors) to produce the desired head or discharge pressure. In this specification, the terms "centrifugal compression" or "compressor" are meant to include turbine compression or turbocompressors, including, for example, axial-flow compressors. In the broad sense of centrifugal compression used herein, compression is effected, at least to a substantial degree, by conversion of velocity head to pressure head.

The reciprocating compressor is used for hydrogen compression, but it has some severe disadvantages, particularly for large-size plants:

(1) All parts are subject to unbalanced, reciprocating stresses; and foundations, frames and other parts must be large. To minimize vibration, speeds are low (400–700 r.p.m.); and capacity is low. Therefore, in large plants, several machines are required. Cost of installing, instrumenting, protecting and piping several machines is high. Considerable land is required, and plants are bigger and more complex, making them more difficult to control.

(2) The reciprocating machine is less reliable than centrifugal machines, and it is common practice to design plants with one or two expensive spare machines ready to come on-stream in the event of a failure.

(3) The reciprocating machine produces a pulsating gas supply which sonically transmits vibration to piping instruments and other plant facilities. Such vibrations can cause hazardous failures with hydrogen at high pressure.

(4) The low speed of reciprocating compressors tends to limit prime movers to low speed, electric motors or gas engines. While it is possible to use high speed steam or gas turbines, large reduction gears must be used. The pounding of the reciprocating loads has led to poor experience with these units. Hydrocracking and hydrogen manufacturing processes can be designed to produce byproduct steam if it could be used in steam turbine drivers. However, for the reasons just given, this byproduct steam is generally not used to drive the reciprocating compressors.

(5) Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| | | | |
|---|---|---|---|
| Barometer, p.s.i.a. | 14.4 | 14.4 | 14.4 |
| Inlet temperature, °F | 60.0 | 60.0 | 110.0 |
| $k$ (Cp/Cv for inlet gas) | 1.11 | 1.398 | 1.36 |
| Inlet capacity, c.f.m. | 20,000.0 | 20,000.0 | 20,000.0 |
| Head, ft.-lb. per lb. | 22,000.0 | 22,000.0 | 22,000.0 |
| Molecular weight | 63.0 | 28.95 | 10.1 |
| Inlet pressure, p.s.i.a. | 16.73 | 14.73 | 14.08 |
| Discharge pressure, p.s.i.a. | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 p.s.i.g. starting from a pressure of 200 p.s.i.g. On the other hand, two stages of a reciprocating positive displacement compressor could increase the pressure from 200 p.s.i.g. to 1,700 p.s.i.g. Thus, in spite of their problems previously discussed, reciprocating compressors have heretofore been used in bringing high purity hydrogen to high pressure.

SUMMARY OF THE INVENTION

According to the present invention, an improved process is provided for manufacturing high pressure, high purity hydrogen which comprises:

(1) Generating at a pressure below about 900 p.s.i.g. a hydrogen-rich gas containing sufficient $CO_2$ so that the molecular weight of the hydrogen-rich gas is at least four;

(2) Centrifugally compressing the hydrogen-rich gas from the pressure below about 900 p.s.i.g. to a substantially higher pressure above 900 p.s.i.g. to obtain high pressure hydrogen-rich gas;

(3) Removing $CO_2$ from the high pressure hydrogen-rich gas to obtain high purity hydrogen, at least part of the $CO_2$ being removed by absorbing $CO_2$ in a physical absorbent.

Heretofore, centrifugal compression has not been used to bring high purity hydrogen to high pressures used, for example, in hydrocracking. This is because of the inapplicability of centrifugal compressors in compressing high purity hydrogen to high pressures, generally above 450 p.s.i.g., and most frequently above 900 p.s.i.g.

The present invention is based on the idea that the raw hydrogen may advantageously be compressed before $CO_2$ removal, thus making possible the use of a centrifugal compressor because of the higher molecular weight of the gas mixture of $H_2$ and $CO_2$ It is surprisingly found that, in spite of the facts that much energy is expended in bringing the $CO_2$ to a high pressure and what is desired is to bring only the high purity hydrogen to a high pressure since the $CO_2$ will ordinarily be vented, the new method provides an over-all more advantageous process.

According to a preferred embodiment of the present invention, purified $H_2$ gas is obtained by centrifugally compressing a raw, $H_2$-rich gas containing $CO_2$ to high pressure and then removing the $CO_2$ at high pressure by cooling to condense out a portion of the $CO_2$ and removing residual (left after removing the condensed liquid $CO_2$) gaseous $CO_2$ from the $H_2$ gas using a physical absorbent to physically absorb the residual $CO_2$. According to a preferred embodiment of the present invention as integrated with a hydroconversion process, the purified $H_2$ gas is reacted with hydrocarbons in a hydroconversion zone; and the hot effluent from the hydroconversion zone is used to generate at least part of the steam to drive the centrifugal compressors which are used to compress the raw, $H_2$-rich gas containing $CO_2$.

Some of the more salient advantages realized in accordance with the present invention and preferred embodiments of the present invention are:

(1) Centrifugal compression replaces reciprocating compression and the problems of reciprocating compression. Simpler, less expensive, more reliable plants result. Maintenance expenses, including labor and parts required to repair the positive displacement reciprocating compressors, are reduced. Also, the possibility and/or amount of production stoppage due to compressor breakdown is greatly reduced. Hazard due to equipment failure on high pressure equipment is decreased.

(2) Because the $CO_2$ is brought to a high pressure as well as the hydrogen, improved methods of removing $CO_2$ fit advantageously into the hydrogen production scheme. For example, condensation of $CO_2$ is attainable much more readily at the higher pressures because extremely low temperatures are not required. Initial condensation of $CO_2$ is obtained by cooling to about 0° F. if the partial pressure of $CO_2$ is at least 306 p.s.i.a. (306 p.s.i.a. corresponds to about 20 percent $CO_2$ in a $H_2$, $CO_2$ gas mixture at 1,500 p.s.i.a.). Further condensation is attainable by cooling to lower temperatures with the result that only a fraction of the original $CO_2$ is left in the hydrogen-rich gas. Thus, in a preferred embodiment of the present invention, the $CO_2$ absorption requirements of the absorbent are reduced as the absorbent only is required to absorb the fractional amount of $CO_2$ left in the hydrogen-rich gas after condensation and separation of a large (e.g., from 25 to 95 percent, preferably about 50 to 70 percent) portion of the $CO_2$ in the raw, hydrogen gas mixture.

Since the absorption takes place at high pressures and since at least part of the $CO_2$ is advantageously condensed at high pressures, much of the cooling required for the low temperature absorption can be obtained by subsequent reductions of pressure on the condensed $CO_2$ and/or the $CO_2$-rich absorbent. The absorbent is regenerated primarily by expansion to a lower pressure. The desorption of the carbon dioxide effects substantial cooling of the absorbent and thus lowers the temperature of the absorbent which was earlier raised by the heat of absorbing $CO_2$. Also the high pressure condensed $CO_2$ separated from the raw hydrogen gas can be used to remove large quantities of heat from the feed to the $CO_2$ absorber, as the condensed $CO_2$ is expanded to substantially lower pressures and is therefore available as a refrigerant.

(3) Because of the high pressure obtained by centrifugally compressing the $H_2$ and $CO_2$, nearly all of the $CO_2$ may be removed from the $H_2$ relatively easily by physical absorption of the $CO_2$.

In using the physical absorption, the solubility with respect to temperature and pressure follows the normal trends; that is, increased solubility with decrease in temperature or increase in pressure. Thus the high pressure works to the advantage of the absorption step in two respects. It increases the ability of the absorbent to absorb $CO_2$ because of the high pressures. Also, since the high pressures result in a system that is easily completely or nearly completely self-refrigerated, low temperatures are economically obtainable so that the absorption may be carried out at low temperature where the solubility of $CO_2$ (or $C_2$ and $H_2S$) in the absorbent is relatively high. The refrigerating of the absorption step is effected primarily by expansion of released $CO_2$ which is desorbed from the high pressure, $CO_2$-rich absorbent by reducing the pressure on the $CO_2$-rich absorbent.

The high pressure required in the absorption step of the present invention generally is between about 450 p.s.i.g. and 4,000 p.s.i.g., but pressures as high as 5,000 to 10,000 p.s.i.g. may be employed. However, the more usual pressure range is between 900 p.s.i.g. and 3,000 p.s.i.g.

(4) Because of the improved methods of removing $CO_2$, less heat is needed in the $CO_2$ removal step. Specifically, less heat is needed to regenerate the $CO_2$ absorbent. This is largely because the absorbent is regenerated primarily or, in some instances, solely by reducing the pressure on the absorbent so as to release the $CO_2$ which has been physically absorbed at the high pressure obtained by centrifugal compression of the $H_2$-rich gas containing $CO_2$.

(5) Since less heat is needed in the $CO_2$ removal step, which heat is generally supplied by the effluent from the steam reforming or partial oxidation zone, this effluent heat is now used, for example, to generate steam which is readily useable in the high speed turbines driving the high speed, raw hydrogen gas centrifugal compressor or compressors.

(6) Heat available from the effluent of a hydroconversion zone using the high purity, high pressure hydrogen from the hydrogen production zone can be used to generate steam to drive the centrifugal compressor of the hydrogen production zone.

BRIEF DESCRIPTION OF THE DRAWING

The drawing is a schematic flow sheet of a preferred embodiment of the invented process. The major process steps shown in the drawing include: facilities for generating $H_2$-rich gas containing $CO_2$, steam boilers for producing steam to drive the centrifugal compressor, a centrifugal compressor for obtaining high pressure $H_2$-rich gas containing $CO_2$, heat exchange for cooling the $H_2$-rich gas containing $CO_2$ and condensing a part of the $CO_2$, absorption facilities for removing $CO_2$ (or $CO_2$ and $H_2S$) from the $H_2$-rich gas, and a hydroconversion zone for reacting the purified $H_2$ gas with hydrocarbons in reactors, with the hot effluent from these hydroconversion reactors being used to generate steam to drive the centrifugal compressor.

DETAILED DESCRIPTION OF THE DRAWING

Referring now in more detail to the embodiment of the invention shown in the drawing, partial oxidation or steam reforming is carried out in accordance with well-known processes in zone 12.

In the case of partial oxidation, a hydrocarbon, which may be a gas, oil or a solid, is fed to the partial oxidation zone through line 10. Steam and/or oxygen is fed to the partial oxidation zone through line 11. The hydrocarbon and oxygen are reacted in a partial oxidation reactor at elevated temperatures, either with or without catalyst, according to well-known processes to produce $H_2$, CO and $CO_2$. Pressure in the partial oxidation reactor typically is between 200 and 600 p.s.i.g. and temperature between 2,000 and 3,200° F.

$H_2S$ is formed in the partial oxidation reaction if the hydrocarbon feed to the partial oxidation reactor contains sulfur compounds. The $H_2S$ formed may be removed before passing the partial oxidation reactor effluent to the COO shift conversion reactor. If the partial oxidation reaction is conducted at high pressure—e.g., in excess of 600 p.s.i.g.—the $H_2S$ may be removed using a physical absorbent or a combination physical absorbent with a chemical absorbent. In the present invention, it is advantageous to remove the $H_2S$ with the concurrent removal of $CO_2$ prior to the CO shift conversion step, as there is sufficient $CO_2$ formed in the CO shift conversion step to raise the molecular weight of the hydrogen-rich gas stream to at least four, thus making feasible the use of centrifugal compression for obtaining a high pressure $H_2$-$CO_2$ gas mixture.

Because there are, however, sulfur resistant CO shift conversion catalsyts available, the $H_2S$ may alternatively be left in the hydrogen-rich gas feed to the CO shift converter. In this case, it is preferred to compress the $H_2$-$CO_2$-$H_2S$ gas mixture from the CO shift converter to high pressure and then remove the $CO_2$ and $H_2S$ as by physical absorption or a combination of condensation and physical absorption of the $CO_2$ and $H_2S$.

In the case of steam reforming, a desulfurized feedstock is mixed with superheated steam and charged to a steam reforming furnace. The furnace consists of a combustion chamber in which are located alloy tubes containing a nickel base catalyst. While passing over the catalyst, the hydrocarbons are converted to $H_2$, $CO_2$, and CO. The furnace supplies the heat needed to maintain the temperature for the endothermic reaction. Outlet temperature from the reforming furnace is usually maintained between 1,400–1,620° F., and pressure maintained between about 75 and 450 p.s.i.g. As in the case of partial oxidation, carbon monoxide in the effluent hydrogen-rich gas from the steam reformer is reacted with water in one or more shift reactors to produce more $H_2$ and $CO_2$ and reduce the CO content to about 0.2–2 volume percent.

The raw hydrogen gas from zone 12 comprised predominantly of $H_2$ and containing a minor amount of $CO_2$ (and, in some cases, also containing $H_2S$) passes via line 13 from the shift conversion step in zone 12 to a steam boiler E-1 where steam is generated from the boiler feed water passed through lines 60 and 61 into E-1. The raw hydrogen gas which has been cooled in steam boiler E-1 passes through water cooler 14 and then to separator 15. Water that has been condensed from the raw hydrogen gas is removed through line 70 and passed to further processing not shown. The raw hydrogen gas is withdrawn from the separator through line 16 and passed to centrifugal compressor 17. The centrifugal compressor substantially increases the pressure of the $H_2$, $CO_2$ gas mixture; i.e., the pressure is increased by at least 200 p.s.i. Preferably the pressure is increased by 450 p.s.i., and still more preferably the pressure is increased by as much as 1,000 or 1,500 p.s.i. For example, when the raw hydrogen gas is generated by steam reforming, the pressure is advantageously raised from below about 450 p.s.i.g. to above about 900 p.s.i.g., preferably above 1,300 p.s.i.g. Presence of the $CO_2$ in the raw, hydrogen-rich gas that is passed to the centrifugal compressor not only increases the molecular weight of the gas mixture but also increases the volume of the gas mixture. Both of these factors increase the applicability of centrifugal compressors as opposed to reciprocating.

In the preferred embodiment shown in the drawing, all of the gas from $H_2$ manufacturing zone 12 is passed to the centrifugal compressor. Because of the 17 to 40 volume percent $CO_2$ present, along with other impurities such as CO, the molecular weight of this $H_2$-rich gas is between about 10 and 25. Within the concept of the present invention, it is practical to lower the molecular weight of the $H_2$-rich gas to as low as about 4 by removing part of the $CO_2$ and then using centrifugal compressors for compression to high pressure. Thus an alternate to the embodiment of the present invention wherein the hydrogen-rich gas is compressed before $CO_2$ removal is centrifugal compression after partial $CO_2$ removal but before final $CO_2$ removal. A gas mixture of $H_2$ and $CO_2$ containing about 5 volume percent $CO_2$ has a molecular weight of four.

High pressure, raw hydrogen gas is withdrawn from the centrifugal compressor through line 18 and cooled by heat exchange with cooling water in exchanger E-3. To avoid icing, antifreeze is added through line 19 to the effluent raw hydrogen gas from E-3. Acetone or methanol, for example, may be used as the antifreeze. Then the gas is passed in line 21 through exchanger E-4 and further cooled by a refrigerant, for example, ammonia. The refrigerant will serve to remove imbalance heat loads from the system during start-up and also to remove excess heat that is not removed by the $CO_2$ and absorbent that are expanded after the $CO_2$ absorption, as is described below. For purposes of illustration, methanol is used as the preferred absorbent in the description of the drawing, although other physical absorbents may be advantageously used.

As distinguished from "chemical absorbents" certain classes of materials are regarded as "physical absorbents." Examples of physical absorbents are methanol, and other monovalent aliphatic alcohols, such as ethyl alcohol and propyl alcohol, or cyclic alcohols, such as cyclopentanol and cyclohexanol; aliphatic polyvalent alcohols, such as ethylene glycol, propylene glycol and glycerin; lower ketones, such as acetone, diethylketone, methylbutylketone; N-alkylated pyrrolidones, such as N-methyl pyrrolidone; N-alkylated piperidones; and sulfones, such as tetrahydrothiophene 1,1-dioxide and the homologues thereof; dialkyl ethers of a polyalkylene glycol such as the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol. Particularly preferred physical absorbents for use in the present invention are propylene carbonate, acetone, and methanol.

Although according to a preferred embodiment of the present invention carbon dioxide is absorbed primarily by high pressure physical absorption, a minor amount of chemical absorbent may be mixed with the physical absorbent—for example, to increase the efficiency in lowering the $CO_2$ content in the $H_2$ gas to very low concentrations. Thus where it is desired to reduce the $CO_2$ concentration to about 500 p.p.m. by volume or lower, it is advantageous to mix with the physical absorbent certain "chemical absorbents," such as alkanolamines or other compounds whose absorption mechanism involves the formation of salts or other decomposable reaction products; i.e., products which when heated decompose to release the chemically absorbed $CO_2$ and thus regenerate the chemical absorbent. Among the alkanolamines which act as chemical absorbents, monoethanolamine and diethanolamine can be used with particular advantage. Other typical chemical absorbents are dipropanolamine, diisopropanolamine, alkyl phenyl alkyl amines, alkoxy alkyl amines and alkoxy aryl amines. In contrast to physical absorbents, chemical absorbents, such as MEA, have little increased ability to absorb $CO_2$ at high pressures versus lower pressures of about 250 p.s.i.g.

The raw hydrogen gas passes in line 22 to exchanger E-5 where it is further cooled by expanding $CO_2$ that was previously condensed by cooling the high pressure raw hydrogen gas. Thus expanding low temperature $CO_2$ is used to cool high pressure raw hydrogen gas and condense $CO_2$.

The raw hydrogen gas in line 23 from E-5 then passes through E-6 where it is still further cooled (with resultant increased $CO_2$ condensation) by exchange with the absorber overhead. The effluent from E-6, comprising $H_2$, liquid $CO_2$ or $CO_2$ and $H_2S$, and residual $CO_2$ or $CO_2$ and $H_2S$ at a pressure of, for example, 1,700 p.s.i.g., is passed in line 24 to absorber 25. In absorber 25, $CO_2$ or $CO_2$ and $H_2S$, that has been condensed due to cooling in the preceding exchangers, drops to the bottom; and residual, gaseous $CO_2$ or $CO_2$ and $H_2S$ is absorbed in methanol absorbent and thus removed from the raw hydrogen gas as the gases pass upward in absorber 25. Hydrogen gas containing about 1.0 percent $CO_2$ and 1.0 to 2.5 percent CO by volume passes out the absorber in line 48. After transferring heat in exchanger E-6, the hydrogen gas stream is passed in line 49 to methanation zone 50.

Rich absorbent, laden with $CO_2$ and possibly $H_2S$, is removed along with condensed liquid $CO_2$ in line 26 from the bottom of absorber 25. After reducing the pressure, the absorbent and liquid $CO_2$ are passed in line 27 to first letdown drum 28 where a small amount of dissolved hydrogen is flashed off and removed in line 29. This hydrogen is recycled to the compressor for recovery via line 71. Because the hydrogen is much more volatile and less soluble in the absorbent than $CO_2$, the hydrogen may be removed as a gas while the $CO_2$ remains in the liquid phase. The absorbent and liquid $CO_2$ are passed from the first letdown drum in line 30 to expander 31 where the pressure is further reduced. The expander 31 recovers work energy from the expanding and vaporizing $CO_2$, which work energy can be used, for example, to drive absorbent pump 36. $CO_2$ and absorbent leave expander 31 in line 32 to second letdown drum 33. Low temperature, gaseous $CO_2$ resulting from the expansion is withdrawn from the second letdown drum in line 34 and passed through E-5 countercurrent to high pressure $H_2$-rich gas containing $CO_2$ to remove heat from the $H_2$-rich gas containing $CO_2$. In the partial oxidation process, the $CO_2$ in line 34 may contain $H_2S$; and it may be advantageous to process this gas for $H_2S$ removal from the $CO_2$ before warming in E-5. This can be done in a separate column with a small stream of purified absorbent from line 47. $CO_2$ is withdrawn from heat exchanger E-5 in line 9 and vented or passed to further processing.

Methanol absorbent in line 35 from the bottom of the second letdown drum contains a small amount of $CO_2$ not flashed off as a gas in the second letdown drum. This absorbent, which has been cooled to about $-80°$ F. due to $CO_2$ flashing off from the absorbent, is passed in part to an intermediate point in absorber 25 via lines 37 and 38. Although the methanol absorbent in line 38 has not been completely freed of $CO_2$, it still is effective to remove $CO_2$ because of its low temperature (which tends to condense $CO_2$), as it is introduced to the absorber at a point where the $CO_2$ concentration is sufficiently high that there is ample driving force from the gas phase into the liquid $CO_2$ absorbent phase. The remaining part of the absorbent is passed in line 39 through cooler E-7 into the top of absorbent regenerator 41 via line 40. The reboiled regenerator 41 frees this part of the absorbent of essentially all $CO_2$ or $CO_2$ and $H_2S$ remaining in the absorbent removed from the second letdown drum. The thus purified absorbent is withdrawn from absorbent regenerator 41 in line 46 at an intermediate position, below absorbent inlet line 40 but substantially above the bottom of regenerator 41. This lean absorbent is cooled to about $-65°$ F. by passing through E-7 countercurrent to the regenerator feed. The lean methanol absorbent is withdrawn from E-7 in line 47 and passed to the top part of absorber 25.

Reboiling heat is supplied to the regenerator 41 by reboiler E-8, which reboils a portion of the regenerator bottoms using steam as a heating medium. A small amount of water is withdrawn from the bottom of regenerator 41 in line 43. $CO_2$ is withdrawn in line 42 from the top of regenerator 41 as a gas and is vented or passed to further processing. In the case where partial oxidation is used to generate the raw $H_2$-rich gas, typically the gas withdrawn in line 42 from regenerator 41 will contain $H_2S$. In this instance, the gases from the regenerator may be passed to a Claus process for the production of sulfur if there is sufficient $H_2S$ in the $CO_2$-$H_2S$ gas mixture in line 42.

In methanation zone 50, the CO and $CO_2$ in the hydrogen-rich gas effluent from absorber 25 are converted to methane and steam by the following reactions:

$$CO + 3H_2 \rightleftharpoons CH_4 + H_2O$$

$$CO_2 + 4H_2 \rightleftharpoons CH_4 + 2H_2O$$

High pressure, in excess of 450 p.s.i.g., favors the conversion of carbon oxides in the methanation zone. High purity hydrogen, containing no more than 20 parts per million carbon oxides and about 4 percent other impurities, such as $CH_4$, is withdrawn in line 51 from the methanation zone. It is passed together with recycle hydrogen through lines 53 and 54 and reacted with hydrocarbons in the hydroconversion zone 55.

Alternatively to the methanation zone, a copper liquor system may be employed to remove CO, as the copper liquor systems are advantageously used at high pressure for absorbing CO so as to obtain high purity hydrogen. In general, the term "high purity hydrogen" connotes hydrogen purity of about 96 to 99+ volume percent, with the balance being impurities comprising $CH_4$, $N_2$ and small amounts of carbon oxides. But in some cases, the high purity hydrogen may contain 5 to 8 percent impurities by volume, particularly when the $CH_4$ content is relatively high in the product hydrogen. The term "high purity hydrogen" is used to refer to the hydrogen either before or after methanation or alternative processing for reduction of the carbon oxides from small conentrations down to the parts per million level.

Hydrocarbon feed enters the hydroconversion zone through lines 52 and 54. The hydroconversion zone may, for example, be a hydrodesulfurization unit operated at about 1,700 p.s.i.g. and 700° F. reactor pressure and temperature, respectively, and consuming about 500 s.c.f. of hydrogen per barrel of hydrocarbon feed to the hydrodesulfurization unit. As indicated previously, other hydroconversion processes include hydrocracking, hydrotreating or hydrofining and thermal hydrodealkylation. The effluent from the hydroconversion zone, at temperatures between 400–1,200° F., generally between 400–800° F. is withdrawn in line 56. This high temperature effluent stream is passed through steam boiler E–2 wherein heat is removed from the hydroconversion zone effluent to generate steam. The steam is generated from the boiler feed water passed through lines 60 and 62 into the steam boiler. Steam is withdrawn from steam boiler E–1 in line 64 and from steam boiler E–2 in line 63 and passed in line 65 to trubine driver 67. Thus steam is produced through heat recovery from the hydroconversion zone as well as from the hydrogen production zone to drive the turbine driver 67. The turbine driver 67 in turn furnishes the motive power for raw hydrogen gas centrifugal compressor 17. Either back pressure steam turbines or condensing steam turbines are used to drive compressor 17. Exhaust steam is withdrawn from the turbine in line 66.

After heat is recovered from the hydroconversion zone effluent in steam boiler E–2, the effluent is passed in line 57 to separator 58. Recycle hydrogen is withdrawn from the separator in line 68; and oil is withdrawn from the bottom of the separator in line 59 for further processing, such as fractionation or further hydroconversion.

Steam generated by the steam boilers in addition to that required by turbine driver 67 is withdrawn in line 69 and is used to reboil the absorbent regenerator reboiler E–8 and to supply steam to partial oxidation or steam reforming zone 12. In the case of steam reforming, a large quantity of steam is generated by removing heat from the reforming reactor effluent prior to CO shift conversion. This steam may be used to drive turbine driver 67 and to supply steam needed for the steam reforming reaction. Exhaust steam from turbine driver 67 is used elsewhere or is condensed depending upon the design of the turbine driver.

Example 1

The following example is based on calculated improvements (which could be made using the principles of this invention) to a new plant which produces 135 mm.s.c.f.d. (million standard cubic feed day) hydrogen.

Natural gas is fed in line 10 and steam in line 11 to a steam methane reformer furnace. Furnace effluent comprising $H_2$, $CO_2$ and CO is quenched by spraying water into the hot gas; and then the effluent is successively passed through a high temperature CO shift converter, a second water spray quencher, and a low temperature CO shift converter to convert water and CO to $CO_2$ plus hydrogen. A wet, gaseous stream at about 500° F. and containing about 80 percent hydrogen and 18 percent $CO_2$ (dry basis) is then cooled in steam boiler E–1, first generating 150 p.s.i.g. steam and then 40 p.s.i.g., and then heating boiler feed water. It is finally cooled with cooling water to condense most of the excess steam in the process gas. A total of about 340,000 lb./hr. of steam is recovered. When augmented with 20,000 lb./hr. of steam generated in steam boiler E–2 and used in turbine driver 67 (which exhausts to water-cooled condensers operating under vacuum), about 24,000 BHP is produced. This is enough to drive centrifugal compressor 17 compressing the hydrogen and $CO_2$ from a pressure of 225 p.s.i.g. to 1,700 p.s.i.g. Because of the reliability and large size of the centrifugal compressor, only one multistage unit is required.

$CO_2$ is then removed from the high pressure gas in absorber 25 using semilean methanol at −90° F. in line 38 and lean methanol at −85° F. in line 47. Semilean methanol is methanol which has not been completely regenerated and contains more $CO_2$ than the essentially completely regenerated methanol withdrawn in line 46 from absorbent regenerator 41. At 1,700 p.s.i.g. pressure, the absorption system is essentially autorefrigerated by expansion of the high pressure $CO_2$. As explained under "Detailed Description," the expanded $CO_2$ is used to cool the $H_2$-$CO_2$ gas feed to absorber 25. Also, the methanol absorbent is cooled by the $CO_2$ as $CO_2$ flashes off from the methanol as pressure is reduced in expanding the $CO_2$-rich absorbent across expander 31. The small amount of CO and $CO_2$ left in the gas from absorber 25 is converted to methane in methanator zone 50. High purity hydrogen is then fed at high pressure to hydroconversion zone 55 for upgrading hydrocarbons introduced in line 52.

In contrast, according to prior art, $CO_2$ is removed from the $H_2$, $CO_2$ gaseous effluent from the CO shift converter using monoethanolamine (MEA) absorbent in an absorber operating at 250 p.s.i.g. Instead of using the heat in the $H_2$-rich gas prior to $CO_2$ removal to generate 340,000 lb./hr. of steam to drive the compressors (as in the invention) in accordance with the prior art, the heat is used to reboil (regenerate) the $CO_2$-rich MEA. To compress the high purity hydrogen according to the prior art, four reciprocating compressors are required (one spare). The three operating reciprocating compressors require 19,000 BHP to compress the high purity hydrogen from 225 ps.i.g. to 1,700 p.s.i.g. Cost of electricity consumed by the electric motors used to drive the reciprocating compressors is $850,000 per year (19,000 hp.×7.46 kw.hr./hp.×$7.22/1,000 kw.hr.
×365×24×.95 Op. Factor).

In the present invention, heat is recovered from the hydroconversion zone 55 effluent to produce, in accordance with this example, about 20,000 pounds per hour of steam. This 20,000 pounds per hour is worth about $65,000/year. Making the conservative assumption that this 20,000 pounds per hour of steam could be utilized elsewhere, and also taking into account about $75,000 per year as the cost of steam for the absorbent regenerator of the present invention and for a small steam-driven refrigeration compressor used in the present invention, the net annular savings using the process of the present invention is $710,000 ($850,000−$65,000−$75,000) for a hydrogen plant producing 135 million standard cubic feet per day of hydrogen.

In addition to this $710,000 annual savings is the important reduction in plant complexity and improved maintenance and safety from the use of centrifugal compressors used in the hydrogen production process of the prior art.

Example 2

This example illustrates a preferred embodiment of the present invention wherein none of the $CO_2$ is removed by condensation. More particularly, the present example summarizes estimated investment and operating costs calculated for a process in accordance with the prior art using monoethanolamine (MEA) for $CO_2$ removal vs.

a process in accordance with a preferred embodiment of the present invention using propylene carbonate for $CO_2$ removal in a 75 mm. s.c.f.d. per day steam methane reforming hydrogen plant. The MEA absorbent is used in a conventional chemical absorption system, which is operated at relatively low pressures. The propylene carbonate absorbent is used in a high pressure physical absorption system which can use a variety of solvents, such as methanol or acetone or n-methylpyrrolidone.

In either process, the effluent from the shift converter has the following composition in moles per hour: $H_2$: 8,849; $CO_2$ 2,253; CO; 28; $N_2$; 51; $CH_4$; 227; $H_2O$; 13; for a total of 11,421 moles per hour. The molecular weight of this gas mixture effluent from the CO shift converter is 10.8. The amount of the gas stream in pounds per hour is thus about 123,000. The gas leaves the shift converter at a pressure of 250 p.s.i.g.

In the process according to the prior art using MEA absorbent for removal of $CO_2$, this gas mixture at 250 p.i.s.g. is passed to a $CO_2$ absorber wherein MEA removes the $CO_2$ from the hydrogen-rich gas mixture by chemical absorption of the $CO_2$. High purity hydrogen obtained from the top of the $CO_2$ absorber is compressed by reciprocating compressors to 1,085 p.s.i.g. so that the pressure of the high purity hydrogen is high enough for use in a hydrocracking unit. The MEA absorbent is regenerated; that is, $CO_2$ is removed from the MEA by stripping in a $CO_2$ stripper. The $CO_2$ stripper uses a steam reboiler to generate hot stripping vapors in the bottom of the $CO_2$ stripper and decompose the MEA-$CO_2$ chemical bond at a temperature of about 200° F. The stripped MEA is removed from the bottom of the stripper, cooled to about 100° F., and passed to the upper part of the $CO_2$ absorber.

For application of the propylene carbonate removal process in accordance with a preferred embodiment of the present invention, the hydrogen-rich gas effluent from the CO shift converter having a molecular weight of 10.8 is centrifugally compressed to a pressure of 1,110 p.s.i.g. The temperature of the compressed hydrogen-rich gas is 110 F. This high pressure feed gas is partially dehydrated by glycol injection before $CO_2$ removal both to avoid hydrates and to maintain the solvent in a nearly anhydrous state.

In order to take advantage of the physical absorbent's higher $CO_2$ capacity at lowered temperatures and to minimize absorbent vaporization losses, the absorption operation is caused to take place at reduced temperatures. This is accomplished by the use of a small propane refrigeration system. Thus the high pressure hydrogen-rich feed gas is cooled to about 25° F. and then fed to the $CO_2$ absorber wherein cold propylene carbonate absorbs $CO_2$.

The propylene carbonate absorbent is both regenerated and cooled to about 0° F. by reducing the pressure on the $CO_2$-rich absorbent withdrawn from the bottom of the $CO_2$ absorber. Purified hydrogen exits from the top of the $CO_2$ absorber at about 12° F. The purified hydrogen passes in countercurrent heat exchange with the centrifugal compressor hydrogen-rich gas effluent so that the purified hydrogen gas stream is heated to 80° F. The pressure of the purified hydrogen-rich gas stream after this heat exchange is about 1.085 p.s.i.g. The composition in moles per hour is: $H_2$: 8,689; $CO_2$: 90; CO: 28; $N_2$: 51; $CH_4$: 227; for a total of 9,085 moles per hour. The molecular weight of this purified hydrogen stream is about 3.01. So that the purified hydrogen will be more suitable for use in a hydrocracker, the purified hydrogen stream is passed to a methanator for conversion of $CO_2$ and CO to $CH_4$.

Table II below shows that the propylene carbonate system operating at 1,100 p.s.i.g. has an estimated savings $1.96 \overline{M}$ in investment and four-year operating costs when compared with an optimistic MEA system. When compared with an MEA system which has a $CO_2$ pickup of 0.4 mole $CO_2$ per mole MEA (which is more in line with actual operating experience), the savings are about $2.63 \overline{M}$. This estimate is indicative of the savings that can be realized from a process which first compresses the shift converter effluent gases and then removes the $CO_2$ by high pressure physical absorption.

The use of centrifugal compressors contributes a major portion of the savings obtained according to the present invention. For the estimates in Table II, the propylene carbonate process is based on the centrifugal compressor operating at 68 percent efficiency to compress the $CO_2$-containing gas from about 250 p.s.i.g. to 1,110 p.s.i.g. An investment cost of $260 per brake horsepower was used for the reciprocating compressor used to compress purified hydrogen obtained after $CO_2$ removal using MEA absorbent.

The hydrogen stream obtained after physically absorbing the $CO_2$ in a propylene carbonate absorbent contains about 1 percent $CO_2$ impurity. After methanation, the hydrogen purity is thus about 1 percent less than for an MEA system which removes essentially all of the $CO_2$. Table II includes an estimated $50,000 incremental investment required in the hydrocracking unit for a 1 percent decrease in purity in the purified hydrogen which is used in the hydrocracker. Product hydrogen purity obtained in a process using steam methane reforming with propylene carbonate for $CO_2$ removal is estimated to be 95 to 96 percent, depending on the nitrogen in the feed gas to the reformer.

TABLE II.—$CO_2$ REMOVAL AND $H_2$ COMPRESSION FACILITIES

[75M s.c.f.d. hydrogen plant cost estimates in thousands of dollars]

|  | Propylene carbonate absorbent at 1,100 p.s.i.g. | MEA absorbent [1] at 250 p.s.i.g. | Optimistic MEA absorbent [2] at 250 p.s.i.g. |
|---|---|---|---|
| Onplot Investment: |  |  |  |
| $CO_2$ removal | 1,350±300 | 1,900 | 1,660 |
| Compressors | 1,720 | 3,000 | 3,000 |
| Hydrocracker, incremental [3] | 50 |  |  |
| Total | 3,120±300 | 4,900 | 4,660 |
| Four-year operating costs: |  |  |  |
| Power (0.722 cent (kwh.): |  |  |  |
| $CO_2$ removal | 500 | 160 | 130 |
| Compressors | 2,470 | 1,560 | 1,560 |
| Steam (40 cents/1,000 lb.) | 60 | 2,460 | 1,960 |
| Hydrogen loss (35 cents/1,000 s.c.f.) | 200 |  |  |
| Total | 3,230 | 4,180 | 3,650 |
| Investment plus four-year operating costs | 6,350±300 | 9,080 | 8,310 |
| Incremental investment plus four-year operating costs | 0 | 2,630 | 1,960 |

[1] Based on 20 wt. percent MEA aqueous solution and $CO_2$ pickup of 0.4 mole $CO_2$/mole MEA.
[2] Based on 20 wt. percent MEA aqueous solution and $CO_2$ pickup of 0.5 mole $CO_2$/mole MEA.
[3] The propylene carbonate process requires an increased hydrocracker investment because hydrogen purity decreases by about 1%. This $CO_2$ impurity could be reduced if a mixture of propylene carbonate with a chemical absorbent is used as the absorbent.

It is to be understood that the forms of the invention shown and described herein are to be taken only as preferred embodiments. Various changes may be made while still remaining within the spirit and essence of the invention, such as in the arrangement of heat exchangers shown in the drawing, particularly those used to cool the effluent from the centrifugal compressor; the methanation step may be omitted where it is found preferable to produce $H_2$ containing residual amounts of CO and $CO_2$ rather than $CH_4$; the $CO_2$ may be removed in two or more absorbers with, for example, centrifugal compression and/or low temperature CO shift conversion between $CO_2$ absorbents; excess steam may be withdrawn from the steam system at various points other than indicated; and the steam may be used for additional functions, such as driving the absorbent pump instead of using the expander for this service. The invention may advantageously be applied in different embodiments than shown where it is desirable to obtain high pressure, high purity hydrogen. Accordingly, the invention is not to be construed as limited to the specific embodiments illustrated but only as defined in the appended claims.

We claim:

1. In a process for manufacturing high purity by a train of steps comprising reacting hydrocarbon with oxygen-affording gas at conditions including a pressure below 900 p.s.i.g. and elevated temperature to form a gas mixture comprising $H_2$, CO and $CO_2$, reacting CO in the mixture with $H_2O$ to form additional $H_2$ and $CO_2$, and removing the $CO_2$ to provide high purity hydrogen, the improvement for providing the high purity hydrogen at elevated pressure which comprises:
    (a) centrifugally compressing with a centrifugal compressor the gas mixture comprising $H_2$ and $CO_2$ from the pressure below about 900 p.s.i.g. to a substantially higher pressure above 900 p.s.i.g., said mixture containing sufficient $CO_2$ so that the molecular weight of the mixture is at least 4; then
    (b) removing $CO_2$ from said compressed gas by absorbing $CO_2$ in a physical absorbent at a pressure above 900 p.s.i.g. to thus obtain said high purity hydrogen;
    (c) passing the high purity hydrogen to a hydroconversion zone, and reacting said purified hydrogen with hydrocarbons in said hydroconversion zone;
    (d) withdrawing a hot effluent from the hydroconversion zone and passing said hot effluent through a steam boiler to generate steam; and
    (e) using said steam to drive the centrifugal compressor through a steam turbine linkage for said centrifugal compressing.

2. A process for producing high pressure hydrogen for use in a hydrocarbon hydroconversion zone which comprises the following steps:
    (a) steam reforming light hydrocarbons at a pressure between one atmosphere and 450 p.s.i.g. to obtain a gas mixture comprised of hydrogen, CO and $CO_2$;
    (b) passing the gas mixture comprising hydrogen, CO and $CO_2$ to at least one shift converter wherein the CO is converted to $H_2$ and $CO_2$ and an effluent is obtained comprised of $H_2$ and $CO_2$, said effluent containing sufficient $CO_2$ so that the molecular weight of the effluent is at least 4;
    (c) compressing the effluent from the shaft converter comprising $H_2$ and $CO_2$ in a centrifugal compressor to a pressure of at least 900 p.s.i.g. to obtain a high pressure gas mixture comprised of $H_2$ and $CO_2$;
    (d) removing $CO_2$ from the high pressure gas mixture comprised of $H_2$ and $CO_2$ to obtain high purity hydrogen, at least part of the $CO_2$ being removed by absorbing $CO_2$ at high pressure in a physical absorbent;
    (e) passing the high purity hydrogen to a hydroconversion zone wherein hydrogen is reacted with hydrocarbons and a hot hydroconversion zone effluent is obtained;
    (f) passing said hot hydroconversion zone effluent through a steam boiler to generate steam;
    (g) driving said centrifugal compressor using: (1) said steam generated by heat obtained from said hot hydroconversion zone effluent; plus (2) steam generated by heat obtained from said shift converter effluent.

3. A process for producing high pressure hydrogen for use in a hydrocarbon hydroconversion zone which comprises the following steps:
    (a) steam reforming of light hydrocarbons at a pressure between one atmosphere and 450 p.s.i.g. to obtain a gas mixture comprised of hydrogen, CO and $CO_2$;
    (b) passing the gas mixture comprising hydrogen, CO and $CO_2$ to at least one shift converter wherein the CO is converted to $H_2$ and $CO_2$ and an effluent is obtained comprised of $H_2$ and $CO_2$, said effluent containing sufficient $CO_2$ so that the molecular weight of the effluent is at least 4;
    (c) compressing the effluent from the shift converter comprising $H_2$ and $CO_2$ in a centrifugal compressor to a pressure of at least 900 p.s.i.g. to obtain a high pressure gas mixture comprised of $H_2$ and $CO_2$;
    (d) cooling the high pressure gas mixture comprised of $H_2$ and $CO_2$ to sufficiently low temperature to effect condensation of at least 25 percent of the $CO_2$, thus obtaining liquid $CO_2$ and a hydrogen-rich gas mixture containing residual amounts of gaseous $CO_2$;
    (e) removing $CO_2$ from the hydrogen-rich gas mixture to obtain high purity hydrogen, at least part of the $CO_2$ being removed by absorbing $CO_2$ at high pressure in a physical absorbent;
    (f) passing the high purity hydrogen to a hydroconversion zone wherein hydrogen is reacted with hydrocarbons and a hot hydroconversion zone effluent is obtained;
    (g) passing said hot hydroconversion zone effluent through a steam boiler to generate steam;
    (h) driving said centrifugal compressor using: (1) said steam generated by heat obtained from said hot hydroconversion zone effluent; plus (2) steam generated by heat obtained from said shift converter effluent.

4. A process for producing high pressure hydrogen for use in a hydrocarbon hydroconversion zone which comprises the following steps:
    (a) partially oxidizing hydrocarbons at a pressure between 100 and 600 p.s.i.g. to obtain a gas mixture comprised of hydrogen, CO and $CO_2$;
    (b) passing the gas mixture comprised of hydrogen, CO and $CO_2$ to at least one shift converter wherein the CO is converted to $H_2$ and $CO_2$ and an effluent is obtained comprised of $H_2$ and $CO_2$, said effluent containing sufficient $CO_2$ so that the molecular weight of the effluent is at least 4;
    (c) compressing the effluent from the shift converter comprised of $H_2$ and $CO_2$ in a centrifugal compressor to a pressure of at least 900 p.s.i.g. to obtain a high pressure gas mixture comprised of $H_2$ and $CO_2$;
    (d) cooling the high pressure gas mixture comprised of $H_2$ and $CO_2$ to a sufficiently low temperature to effect condensation of at least 25 percent of the $CO_2$, thus obtaining liquid $CO_2$ and a hydrogen-rich gas mixture containing residual amounts of gaseous $CO_2$;
    (e) removing $CO_2$ from said hydrogen-rich gas mixture containing residual $CO_2$ to obtain high purity hydrogen, at least part of the $CO_2$ being removed by absorbing $CO_2$ at high pressure in a physical absorbent;
    (f) passing the high purity hydrogen to a hydroconversion zone wherein hydrogen is reacted with hydrocarbons and a hot hydroconversion zone effluent is obtained;
    (g) passing said hot hydroconversion zone effluent through a steam boiler to generate steam;
    (h) driving said centrifugal compressor using: (1) said steam generated by heat obtained from said hot hydroconversion zone effluent; plus (2) steam generated by heat obtained from said shift converter effluent.

References Cited

UNITED STATES PATENTS

| | | | |
|---|---|---|---|
| 3,551,106 | 12/1970 | Smith et al. | 423—656 |
| 3,532,467 | 10/1970 | Smith et al. | 423—437 |
| 3,429,803 | 2/1969 | Hallman | 208—108 |
| 3,694,344 | 9/1972 | Munro | 208—58 |
| 3,463,611 | 8/1969 | Haritatos et al. | 208—212 |
| 3,255,572 | 6/1966 | Miller et al. | 55—68 |
| 3,498,067 | 3/1970 | Ranke | 55—68 |

DELBERT E. GANTZ, Primary Examiner

G. J. CRASANAKIS, Assistant Examiner

U.S. Cl. X.R.

55—68; 208—95